(12) United States Patent
Chang et al.

(10) Patent No.: US 12,184,323 B2
(45) Date of Patent: Dec. 31, 2024

(54) ELECTRONIC DEVICE, EXPANSION STRUCTURE FOR ELECTRONIC CARD AND ASSEMBLY METHOD THEREOF

(71) Applicant: Getac Technology Corporation, New Taipei (TW)

(72) Inventors: Kuang-Yeh Chang, Taipei (TW); Yi-Chia Chiu, Taipei (TW)

(73) Assignee: Getac Technology Corporation, New Taipei (TW)

( * ) Notice: Subject to any disclaimer, the term of this patent is extended or adjusted under 35 U.S.C. 154(b) by 375 days.

(21) Appl. No.: 17/589,142

(22) Filed: Jan. 31, 2022

(65) Prior Publication Data

US 2023/0246664 A1   Aug. 3, 2023

(51) Int. Cl.
*H04B 1/3888* (2015.01)

(52) U.S. Cl.
CPC .................. *H04B 1/3888* (2013.01)

(58) Field of Classification Search
CPC ... H04B 1/3888; H04B 1/3816; H04B 1/3818
See application file for complete search history.

(56) References Cited

U.S. PATENT DOCUMENTS 7,112,075 B1 *  9/2006  Su ...................... G06K 13/0843
                                                       439/159
8,130,489 B2     3/2012  Chan et al.
2007/0060198 A1 *  3/2007  Kuo ...................... H04B 1/3818
                                                       455/575.1
2009/0035977 A1 *  2/2009  Chen .................... H04B 1/3816
                                                       439/326

FOREIGN PATENT DOCUMENTS

| CN | 110275578 A | 9/2019 |
| CN | 111221395 A | 6/2020 |
| TW | I543694 B | 7/2016 |

OTHER PUBLICATIONS

JP 2008130847 A, Shiogama Naoki, Card Holder Substrate Attaching Structure, Jun. 2008, pp. 1-9 (Year: 2008).*

* cited by examiner

*Primary Examiner* — Keith Ferguson
(74) *Attorney, Agent, or Firm* — Locke Lord LLP; Tim Tingkang Xia, Esq.

(57) ABSTRACT

The present invention discloses an expansion structure for an electronic card for installing the electronic card. The expansion structure includes a carrier board, a limiting member and a fixing element. The carrier board carries the electronic card. The limiting member includes a sidewall and a blocking piece extended from the sidewall, the sidewall is formed on one side of the carrier board, and the sidewall, the blocking piece and the carrier board jointly define a sliding channel for accommodating the electronic card. The fixing element fixes the electronic card at the carrier board. Thus, a small-size electronic card can be installed on an installation interface of a large-size electronic card by the expansion structure, achieving the effect of sharing the same installation interface.

16 Claims, 6 Drawing Sheets

ELECTRONIC DEVICE, EXPANSION STRUCTURE FOR ELECTRONIC CARD AND ASSEMBLY METHOD THEREOF

BACKGROUND OF THE INVENTION

Field of the Invention

The present invention relates to an expansion structure, and more particularly to an expansion structure for an electronic card.

Description of the Prior Art

Accompanied with the highly developed wireless communications, the 4G mobile communication technology allow electronic devices such as smart phones, tablet computers or laptop computers to be equipped with 4G electronic cards (for example, SIM cards) to thereby run online games or view streaming videos. With the closely subsequent launch of the 5G mobile communication technology, mobile communication network, wireless network and wired network technologies are combined, such that innovations of large networks are further stimulated while transmission speeds are significantly increased, providing a vast application field.

Because the 5G mobile communication technology is still within a promoting stage, there are many areas in which 5G base stations are yet unsupported, and users may need to manually replace 4G electronic cards or 5G electronic cards. However, 4G electronic cards and 5G electronic cards, being different in size, cannot share the same installation interface. Thus, when a 4G electronic card or a 5G electronic card needs to be replaced, a user usually needs to replace the installation interface of the circuit board, causing removal complications or even damage in parts.

Therefore, on the basis of extensive development with the practice of theories, it is an object of the present invention to provide a solution for effectively improving the issues above in aim of improving and resolving the above issues.

SUMMARY OF THE INVENTION

It is a primary object of the present invention to install a small-size electronic card on an installation interface of a large-size electronic cards through an expansion structure, thereby allowing sharing a circuit board with the same installation interface.

To achieve the object above, the present invention provides an expansion structure for an electronic card for installing an electronic card. The expansion structure includes a carrier board, at least on limiting member and a fixing element. The carrier board carries the electronic card. The limiting member includes a sidewall and a blocking piece extended from the sidewall. The sidewall is formed on one side of the carrier board, and the sidewall, the blocking piece and the carrier board jointly define a sliding channel for accommodating the electronic card. The fixing element fixes the electronic card at the carrier board.

To achieve the object above, the present invention further provides an electronic device for installing an electronic card, wherein the electronic card has an insertion end. The electronic device includes a circuit board and an expansion structure. The circuit board is provided with a connector slot. The expansion structure includes a carrier board and a fixing element. The electronic card is fastened at the carrier board and is fixed by the fixing element. A sidewall is formed on one side of the carrier board, and a blocking piece extends inward from the sidewall such that the blocking piece and the sidewall jointly cover the side of the electronic card. The expansion structure is disposed at the circuit board, and is for connecting the insertion end and the connector slot with each other.

To achieve the object above, the present invention further provides an assembly method for assembling an external electronic component to an electronic device. The assembly method includes: providing an electronic device, a carrier board, a fixing element and an electronic card, wherein the electronic device is provided with a circuit board, the circuit board is provided with a connector slot, a sidewall is formed on a side of the carrier board, a blocking piece is extended form the sidewall, the carrier board, the sidewall and the blocking piece jointly define a sliding channel, and the electronic card has an insertion end; inserting one end of the electronic card away from the insertion end into the sliding channel to install the electronic card at the carrier board; fixing the electronic card on the carrier board by the fixing element to form an expansion structure; and connecting the insertion end and the connector slot with each other, and fixing the expansion structure on the circuit board.

The present invention at least provides the following effects. By carrying at least one-third of the area of a bottom surface of the electronic card by the carrier board, the electronic card can be effectively supported by the carrier board. By respectively covering the left and right sides of the electronic card by the limiting members, horizontal movement and axial movement of the electronic card can be restricted. The fixing element is capable of fixing the electronic card on the carrier board. When the electronic card is inserted into the limiting member on the carrier board, stopping and positioning effects are achieved by a block element. The expansion structure can be fixed on the circuit board by a tightening component and a connecting column.

DETAILED DESCRIPTION OF THE EMBODIMENTS

Details and technical contents of the present invention are given with the accompanying drawings below. It should be noted that the accompanying drawings are for illustration purposes and are not to be construed as limitations to the present invention.

The present invention provides an expansions structure for an electronic card for installing an electronic card A.

Figure 1:
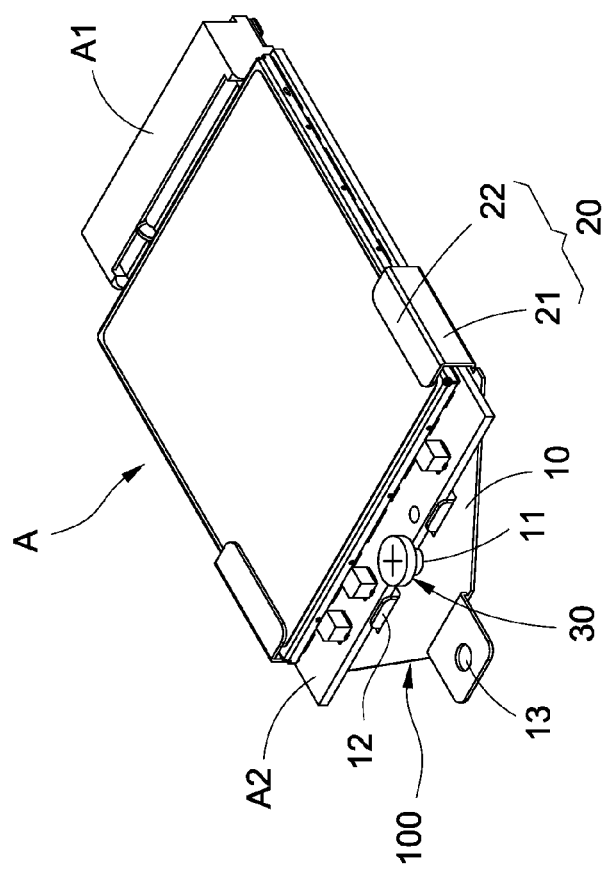
FIG. 1 is a three-dimensional appearance diagram of an expansion structure and an electronic card of the present invention.
Figure 2:
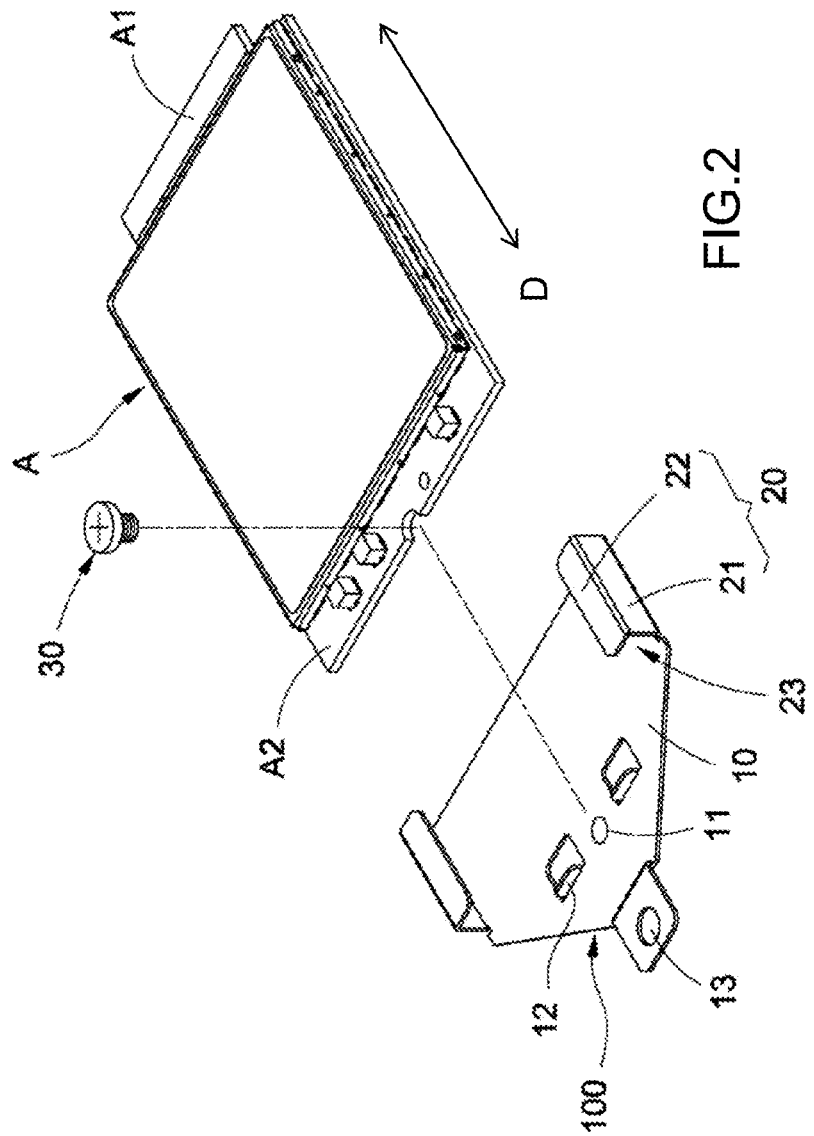
FIG. 2 is an exploded three-dimensional diagram of an expansion structure and an electronic card of the present invention.

Referring to FIG. 1 and FIG. 2, the expansion structure primarily includes a carrier board 10, at least one limiting member 20 and a fixing element 30.

In this embodiment, the electronic card A is a 4G mobile communication chip (for example, a SIM card); however, the present invention is not limited to the example above. For example, the electronic card A may also be a 3G, LTE or 5G mobile communication chip.

The carrier board 10 carries a part of a bottom surface of the electronic card A. Preferably, the carrier board 10 carries at least one-third of the area of the bottom surface of the electronic card A, such that the electronic card A is effectively carried by the carrier board 10. In this embodiment, the carrier board 10 is substantially a plate-like stainless steel metal element; however, the present invention is not limited to the example above. For example, the carrier board 10 may also be other metal plates or plastic plates having certain strength.

The limiting member 20 includes a sidewall 21 and a blocking piece 22 vertically extended from the sidewall 21. The sidewall 21 is formed on one side of the carrier board 10, and the sidewall 21, blocking piece 22 and the carrier board 10 jointly define a sliding channel 23 for accommodating the electronic card A along a sliding direction D. In this embodiment, the number of the limiting member 20 is two, and the two limiting members 20 are respectively disposed on two sides of the carrier board 10. Thus, the sliding channels 23 formed at the limiting members 20 can respectively cover left and right sides of the electronic card A, thereby limiting horizontal movement and axial movement of the electronic card A such that the electronic card A is allowed to slide only in the vertical direction. As shown in FIG. 2, the electronic card A has an insertion end A1 and a fixing end A2 opposite to each other along the sliding direction D. The insertion end end A1 of the electronic card A is correspondingly plugged with a connector slot (not shown in FIG. 2), and the fixing end A2 of the electronic card A is to be fixed on the carrier board 10. The two limiting members 20 are respectively located closer to the fixing end A2 than the insertion end A1 along the sliding direction D.

Figure 3:
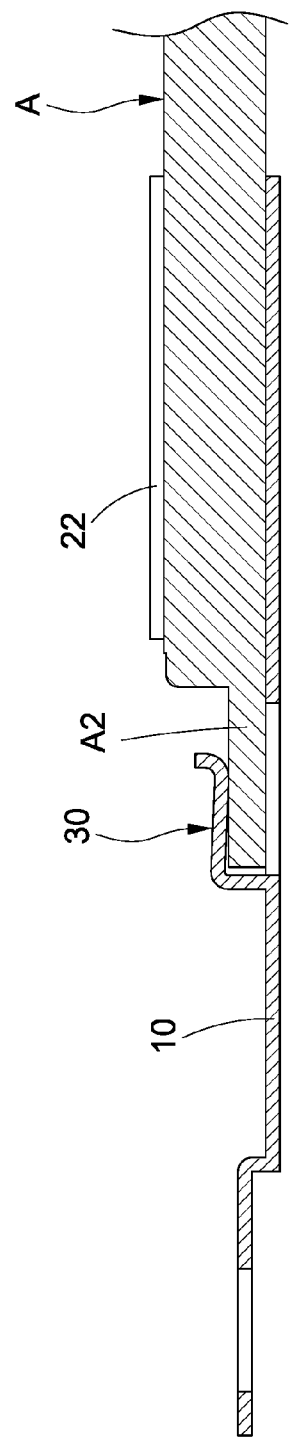
FIG. 3 is a section diagram of an expansion structure and an electronic card according to another embodiment of the present invention.

The fixing element 30 fixes the fixing end A2 of the electronic card A on the carrier board 10. In this embodiment, the fixing element 30 is a screw bolt, the carrier board 10 is provided with a lock hole 11, and the screw bolt passes through the electronic card A and is locked at the lock hole 11, thereby clamping and securing the electronic card A on the carrier board 10; however, the present invention is not limited to the examples above. Referring to FIG. 3 showing an expansion structure according to another embodiment of the present invention, the fixing element 30 may also be an elastic piece disposed on the carrier board 10, wherein the elastic piece is a metal piece capable of clamping the fixing end A2 of the electronic card A on the carrier board 10 by its elasticity. Preferably, a front end of the elastic piece may be an arc to facilitate the electronic card A to be smoothly inserted along the arc and be clamped by pushing the elastic piece upward.

In addition, the carrier board 10 is provided with at least one stopping element 12 in a protruding manner, wherein the stopping element 12 stops at one end of each sliding channel 23 into which the electronic card A is inserted. More specifically, the stopping element 12 vertically stops the electronic card A, so that the electronic card A is allowed to be pushed to an expected location and be fixed by the fixing element 30. In this embodiment, the stopping element 12 is a metal piece formed by stamping and bending the carrier board 10, the number of the stopping element 12 is two, and the two stopping elements 12 are respectively located on left and right sides of the locking hole 11 (in other words, the two stopping elements 12 are respectively located at two sides of the fixing element 30 when the fixing end A2 of the electronic card A is fixed by the fixing element 30); however, the present invention is not limited to the examples above. For example, the stopping element 12 may also be a welded metal piece or metal block, and the number of the stopping element 12 may be one, given that the electronic card A is provided with a stopping effect.

The present invention further provides an electronic device primarily including a housing (not shown), a circuit board 50, an electronic card A, the expansion structure 100 described above, and a tightening component 60.

Figure 4:
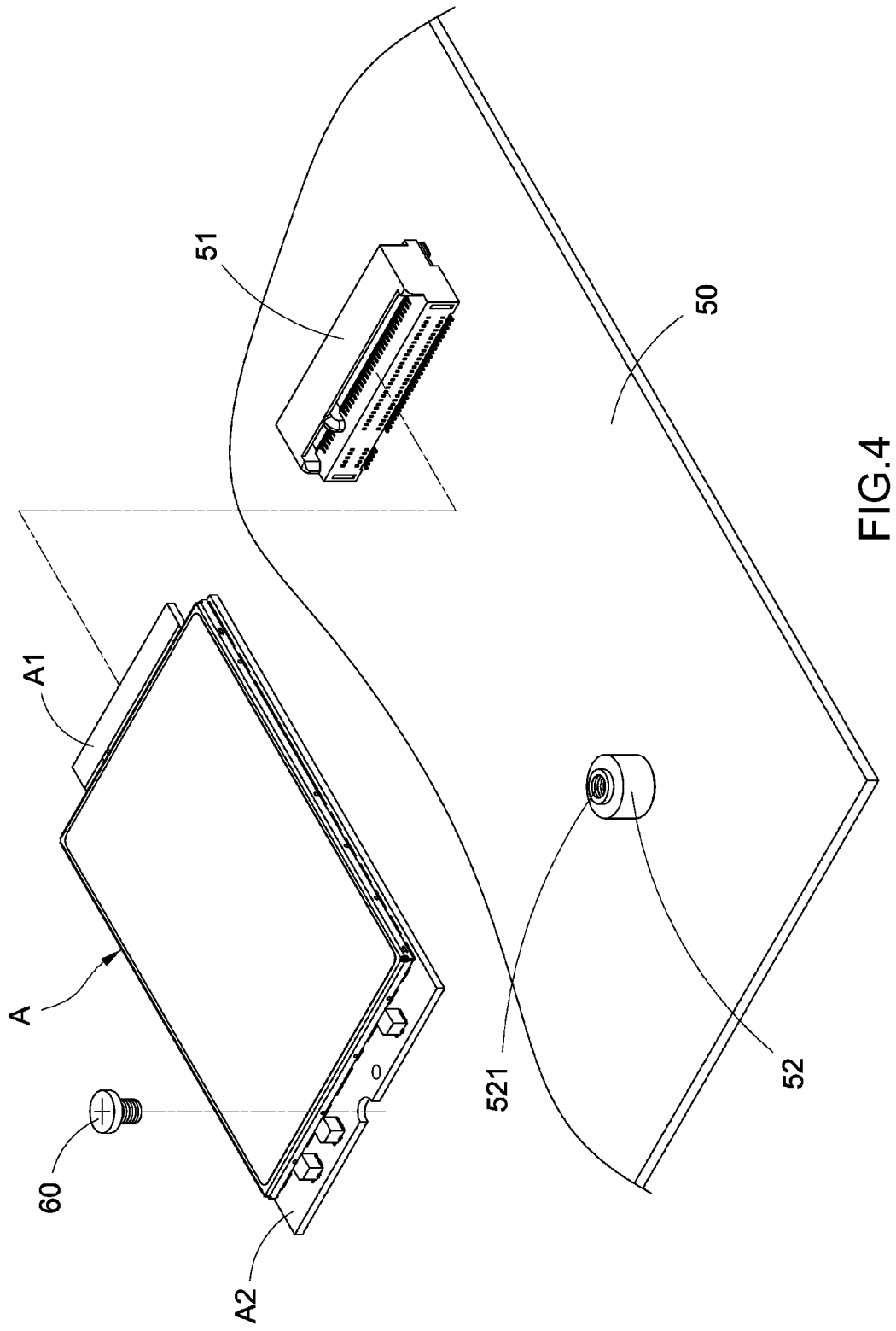
FIG. 4 is an exploded three-dimensional diagram of an electronic card and a circuit board.

Referring to FIG. 4, the circuit board 50 is disposed in the housing (not shown), a connector slot 51 and a connecting column 52 are disposed on the circuit board 50, and the electronic card A in FIG. 4 is a 5G mobile communication chip having an insertion end A1 and a fixing end A2 on two ends thereof, respectively. The insertion end A1 of the electronic card A is correspondingly plugged with the connector slot 51, and the fixing end A2 of the electronic card A is fixed at the connecting column 52 by the tightening component 60. In this embodiment, the tightening component 60 is a screw bolt, the connecting column 52 is a screw stud having a screw hole 521, the fixing end A2 has a fixing hole, and the screw bolt passes through the fixing hole of the 5G electronic card A and is locked at the screw hole 521 of the screw stud; however, the present invention is not limited to the examples above.

Figure 5:
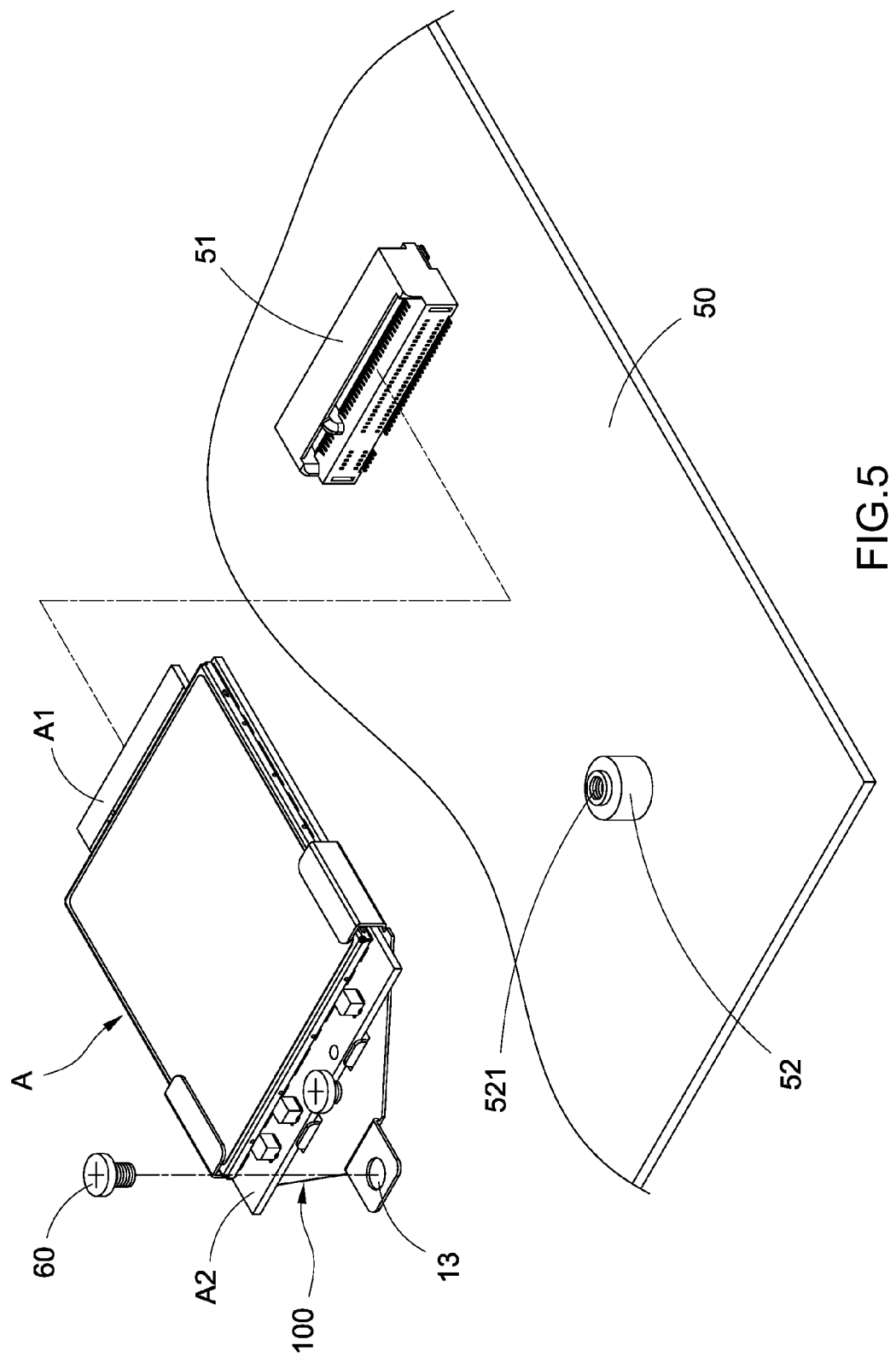
FIG. 5 is an exploded three-dimensional diagram of an expansion structure and a circuit board of the present invention.
Figure 6:
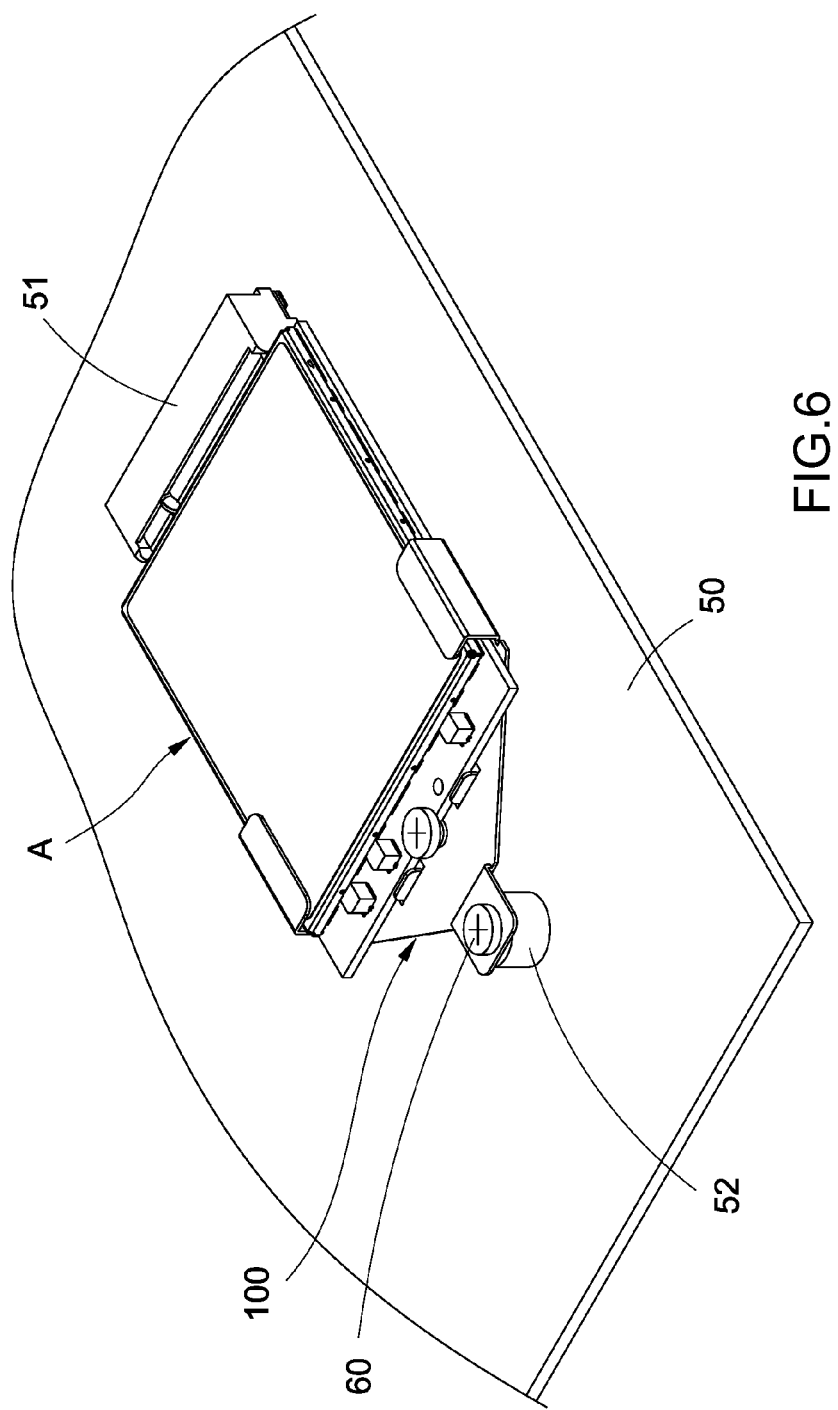
FIG. 6 is a three-dimensional appearance diagram of an expansion structure and a circuit board of the present invention.

Referring to FIG. 5 and FIG. 6, the circuit board 50 is provided with the connector slot 51 and the connecting column 52 described above, and the electronic card A in FIG. 5 and FIG. 6 is a 4G mobile communication chip being smaller in size than a 5G mobile communication chip; however, the present invention is not limited to the examples above. For example, the electronic card A of this embodiment may also be a 3G or LTE mobile communication chip, given that the lengthwise dimension is less than that of the 5G mobile communication chip. The electronic card A is installed on the expansions structure 100 and has an insertion end A1, wherein the insertion end A1 is located on one end of the electronic card A away from the fixing element 30. The expansion structure 100 is disposed on the circuit board 50, so as to achieve an electrical connection between the insertion end A1 and the connector slot 51 connected to each other for signal transmission.

In addition, the carrier board 10 is provided with a through hole 13, and the tightening component 60 passes through the through hole 13 and is tightened with the connecting column 52, thereby fixing the expansion structure 100 on the circuit board 50. In this embodiment, the tightening component 60 is a screw bolt, the connecting column 52 is a screw stud having a screw hole 521, the screw bolt passes through the through hole 13 of the carrier board 10 and is locked at the screw hole 521 of the screw stud; however, the present invention is not limited to the examples above. For example, the tightening component 60 may also be a cap positioning pin, the connecting column 52 may be a column having a positioning hole, and the cap positioning pin and the positioning hole are tightly packed so as to clamp and secure the carrier board 10 of the expansion structure 100 on the connecting column 52 by the cap positioning pin.

Thus, the small-size 4G mobile communication chip can be installed on the expansion structure 100 for length expansion, and the small-size 4G mobile communication chip can then be installed on the installation interface of the large-size 5G mobile communication chip, thereby allowing the differently-sized electronic card A to share the installation interface of the same circuit board 50. Moreover, while a user uses an electronic device, the user is allowed to conveniently and quickly replace the desired electronic card A without needing to also replace the entire circuit board 50.

It should be noted that, the assembly method for the electronic device and the expansion structure 100 of the present invention includes the following steps. First of all, one end of the electronic card A away from the insertion end A1 is inserted into the two sliding channels 23 on the left and right sides of the carrier board 10, and the electronic card A is pushed vertically until being stopped and positioned by the stopping elements 12. Then, the electronic card A is fixed on the carrier board 10 by the fixing element 30 to thereby form the expansion structure 100. The insertion end A1 and the connector slot 51 are connected to each other, and the tightening component 60 passes through the through hole 13 and is fixed with the connecting column 52, thereby fixing the expansion structure 100 on the circuit board 50 to complete the assembly.

In conclusion, the invention is industrially applicable and novel, involves an inventive step, and meets the requirements of a patent application. Therefore, a patent application is filed accordingly. The present invention may be implemented by many other possible embodiments. Without departing from the spirit and the substantiveness of the present invention, various changes and modifications may be made by a person skilled in the art on the basis of the disclosure. It should be noted that, such corresponding changes and modifications are to be encompassed with the scope of protection of the appended claims.

What is claimed is:

1. An expansion structure for an electronic card, for installing the electronic card, the expansion structure comprising:
    a carrier board, carrying the electronic card;
    at least one limiting member, comprising a sidewall and a blocking piece extended from the sidewall, the sidewall formed on one side of the carrier board, and the sidewall, the blocking piece and the carrier board jointly defining a sliding channel for accommodating the electronic card along a sliding direction, wherein the electronic card has an insertion end and a fixing end opposite to each other along the sliding direction, and the at least one limiting member is located closer to the fixing end than the insertion end along the sliding direction; and
    a fixing element, fixing the fixing end of the electronic card at the carrier board.

2. The expansion structure according to claim 1, wherein the fixing element is a screw bolt, the carrier board is provided with a locking hole, and the screw bolt passes through the electronic card and is locked at the locking hole.

3. The expansion structure according to claim 1, wherein the fixing element is an elastic piece, and the elastic piece is disposed at the carrier board and elastically clamps and secures the electronic card.

4. The expansion structure according to claim 1, wherein the carrier board carries at least one-third of an area of a bottom surface of the electronic card.

5. The expansion structure according to claim 1, wherein the carrier board is provided with two stopping elements in a protruding manner, the two stopping elements stop at the fixing end of the electronic card, and the two stopping elements are respectively located at two sides of the fixing element.

6. An electronic device, for installing an electronic card, the electronic device comprising:
    a circuit board, provided with a connector slot; and
    an expansion structure, comprising a carrier board and a fixing element;
    wherein, the electronic card is disposed at the carrier board and is fixed by the fixing element, a sidewall is formed on a side of the carrier board, a blocking piece is extended inward from the sidewall, the blocking piece and the sidewall jointly define a sliding channel to cover the side of the electronic card along a sliding direction, the electronic card has an insertion end and a fixing end opposite to each other along the sliding direction, the electronic card is fixed by the fixing element at the fixing end, and the expansion structure is disposed at the circuit board and connects the insertion end and the connector slot with each other;
    wherein in the expansion structure, the sidewall and the blocking piece are located closer to the fixing end than the insertion end along the sliding direction.

7. The electronic device according to claim 6, further comprising:
    a tightening component;
    wherein, the circuit board is provided with a connecting column in a protruding manner, the carrier board is provided with a through hole, and the tightening component passes through the through hole and is tightened with the connecting column.

8. The electronic device according to claim 6, wherein the fixing element is a screw bolt, the carrier board is provided with a locking hole, and the screw bolt passes through the electronic card and is locked at the locking hole.

9. The electronic device according to claim 6, wherein the fixing element is an elastic piece, and the elastic piece is disposed at the carrier board and elastically clamps and secures the electronic card.

10. The electronic device according to claim 6, wherein the carrier board carries at least one-third of an area of a bottom surface of the electronic card.

11. The electronic device according to claim 6, wherein the carrier board is provided with two stopping elements in a protruding manner, the two stopping elements stop at the fixing end of the electronic card, and the two stopping elements are respectively located at two sides of the fixing element.

12. An assembly method for assembling an expansion structure for an electronic device, comprising:
    providing an electronic device, a carrier board, a fixing element and an electronic card; wherein the electronic device is provided with a circuit board, the circuit board is provided with a connector slot, a sidewall is formed on a side of the carrier board, a blocking piece is extended from the sidewall, the carrier board, the sidewall and the blocking piece jointly define a sliding channel along a sliding direction, and the electronic card has an insertion end and a fixing end opposite to each other along the sliding direction;
    inserting the fixing end of the electronic card into the sliding channel along the sliding direction to install the electronic card at the carrier board;
    fixing the fixing end of the electronic card on the carrier board by the fixing element to form an expansion structure; and connecting the insertion end and the connector slot with each other to fix the expansion structure on the circuit board, wherein in the expansion structure, the sidewall and the blocking piece are located closer to the fixing end than the insertion end along the sliding direction.

13. The assembly method according to claim 12, wherein the carrier board is provided with two stopping elements in a protruding manner, and when the fixing end of the electronic card is inserted into the sliding channel, the electronic card is pushed until being stopped and positioned by the stopping elements, and the two stopping elements are respectively located at two sides of the fixing element.

14. The assembly method according to claim 12, wherein the fixing element is a screw bolt, the carrier board is provided with a locking hole, and the screw bolt passes through the electronic card and is locked at the locking hole.

15. The assembly method according to claim 12, wherein the fixing element is an elastic piece, and the elastic piece is provided at the carrier board and elastically clamps and secures the electronic card.

16. The assembly method according to claim 12, further comprising:

providing a tightening component;

wherein, the circuit board is provided with a connecting column, the carrier board is provided with a through hole, and after the insertion end and the connector slot are connected with each other, the tightening component passes through the through hole and is fixed with the connecting column.

\* \* \* \* \*